Feb. 6, 1968       W. C. BURGESS, JR       3,367,480
                    VIBRATORY CONVEYOR
Filed Nov. 2, 1966                    2 Sheets-Sheet 1

INVENTOR.
WARREN C. BURGESS JR.
BY
ATTORNEYS.

Feb. 6, 1968  W. C. BURGESS, JR  3,367,480
VIBRATORY CONVEYOR

Filed Nov. 2, 1966  2 Sheets-Sheet 2

INVENTOR.
WARREN C. BURGESS JR.
BY
Kramer & Sturges
ATTORNEYS.

United States Patent Office 3,367,480
Patented Feb. 6, 1968

3,367,480
VIBRATORY CONVEYOR
Warren C. Burgess, Jr., 27018 Kennedy Ridge Road,
North Olmsted, Ohio 44070
Continuation-in-part of application Ser. No. 528,931,
Feb. 21, 1966. This application Nov. 2, 1966, Ser.
No. 600,320
4 Claims. (Cl. 198—220)

ABSTRACT OF THE DISCLOSURE

This invention provides a vibrator bowl type conveyor which is improved by providing a pneumatic, free piston vibration-inducing device attached to the base plate supporting the receptacle bowl and adapted to oscillate in the plane of the base plate.

---

This application is a continuation-in-part of my co-pending application Ser. No. 528,931, filed Feb. 21, 1966, now abandoned.

This invention relates to vibratory conveyors, and more particularly to vibratory conveyors of the bowl type wherein articles or parts are fed from a supply thereof disposed within the bowl. Briefly, the invention is characterized in that there is provided a pneumatic, free piston, vibration-inducing device which is mounted so as to oscillate horizontally instead of vertically, and in a plane which is the same as or substantially the same as the plane which includes the bottom of the conveyor receptacle.

Vibratory bowl type parts feeders are well known, and comprise a bowl having an upstanding wall and a trackway which proceeds upwardly from the bottom of the bowl around the periphery to an exit point at the top rim of the bowl. This bowl is mounted on a drive plate, or includes integrally formed therewith a drive plate which is part of an energy storage and release system. The drive plate is mounted upon and supported by a plurality of leaf type springs circumferentially disposed at uniform intervals about the axis of the bowl, and having their lower extremities secured to a base which is desirably a massive unit. These springs are disposed at a predetermined angle to the horizontal, e.g., approximately 75°. This assembly is typically driven by a vibration-inducing device, for example, a pneumatic, vibration-inducing device having a free piston which oscillates in a cylindrical chamber along the path which is coincident with the vertical axis of the bowl. This device is normally mounted on the bottom of the bowl or on the bottom of the drive plate to which the bowl is attached, as the case may be.

When the device is constructed and operated as in the past, the action may become such that the bowl is elastically deformed by the action of the vibration-inducing device. Moreover, when effort is made to feed from these conventional devices, it is found that feeding is greatly affected by changes in the loading of the parts within the bowl among other factors. Under certain circumstances, it can be stopped entirely. It has been found that when operating with a vertically mounted impulse and inertia providing unit, the material or article to be conveyed from the bottom of the bowl is given a very substantial bounce or up and down movement which can be considered as useless motion, and the component of useful energy is relatively low. Ideally, the operation of such vibratory bowl feeders contemplates that all of the vibratory motion should be transmitted along a path described by the vibrating end of the spring, rather than lost in vertical motion. Transmission along a horizontal straight line is a close approximation to the ideal, especially with the impulse generating device located increasingly radially remote from the center of vibration.

It has also been found that conventional variable frequency pneumatic devices, as above described, have been limited as to load capacity. In an 18″ bowl, for example, a load capacity of from about 15 to about 20 pounds was the upper limit before the ability of the device to feed became severly limited or ceased due to a rapid decrease or cessation of the ability of the impulse means to impart lateral movement to the parts or material being fed. It has now been found that, for the same capacity bowl, the vertical motion of the material may be held to a minimum and a substantial part of the energy transmitted to the material converted into lateral motion. Loads in excess of 50 pounds have been utilized without detrimental effect to the rate of feed. In order to achieve such high loading, it is essential to utilize a high inertia system which can best be provided with a free piston vibration inducing device.

Other vibration inducing devices, for example those of the electromagnetic type or of the electric motor driven mechanical type, have been found to be unsatisfactory in high frequency, as may be required to accommodate the change in natural frequency of the system due to the effect of the variation in the live load. With a pneumatic, free piston, vibration-inducing device, however, this device is easily tuned in respect of its frequency to the natural frequency of the entire system. The frequency of vibration of a pneumatic, vibration-inducing device is a function of the pressure of the air or gas being used to drive the piston.

A principal advantage of the improved apparatus of the present invention is that the load carrying capacity of the device may be increased substantially over the load carrying capacity of conventional vibratory conveying devices. Certain embodiments of the present invention have withstood vibrating loads of 240 pounds and more without any indication that the vibrating device had reached its maximum limitation, whereas, conventional devices of comparable size have ceased to function at a much lower load of the order of one-fifth of this. It has also been found that by constructing the vibrating device utilizing principles of optimum geometric design as herein contemplated, there is a substantial improvement in the amount of input energy which is converted into useful work. For example, with the apparatus of this invention employing optimum geometric design with respect to the arrangement and location of the driving force, there may be obtained upwards of 97% conversion of input vibratory energy into useful conveying energy. Experience with devices of the prior art has shown utilization of only a maximum of about 26% of the vibratory input energy being converted into useful work.

It has also been found that the consumption of gas, e.g., air, required to operate the conveyors of the present invention, is substantially improved over that required of comparable devices not employing optimum geometric design. For example, in a bowl type feeder having a bowl diameter of 15 inches, where air consumption has previously been about 4 cubic feet for operation of such a device with a vertically mounted pneumatic, free piston, vibration-inducing device, it has now been found that 2 cubic feet or less of gas are sufficient to operate the same device of the same physical size at substantially the same feed rate, and with an increase in the load carrying capacity of the system.

The advantages of the present invention are achieved by mounting the pneumatic, free piston, vibration-inducing device so that the piston will oscillate along a line which is in the same general plane as the drive plate, or the bottom of the bowl. In general, the mounting means for supporting the pneumatic, free piston, vibration-inducing device are integral with the drive plate itself or the bowl itself. Most importantly, variation of the track speed of parts with changes in the bowl load has been materially reduced. Normally, there is a large increase in the rate of feeding with a decreasing load, with an accompanying increase in bounce and instability of the parts as the bowl empties itself. The devices of the present invention, on the contrary, demonstrate a substantially constant feed rate during emptying of the bowl, and even more surprisingly at the time of refilling, when the loading is suddenly changed. This means a substantial increase in production with reliable performance.

The devices as herein contemplated are particularly useful as driving means for vibratory conveyors and screens, particularly bowl type parts feeders and screens wherein rapid, dependable movement of a particle or an article of manufacture along a predetermined arcuate pathway is desired. The pathway may be curved, helical or spiral, horizontal or inclined, or any variation or combination thereof. Vibratory conveying apparatus with which the advantages of the present invention can be secured include vibratory conveyors characterized by material hoppers having an upstanding circular wall and having disposed about the interior wall thereof a spiral track receding from a more central part of the bottom of the bowl upwardly, around and outwardly to the upper lip of the bowl.

Figure 1:
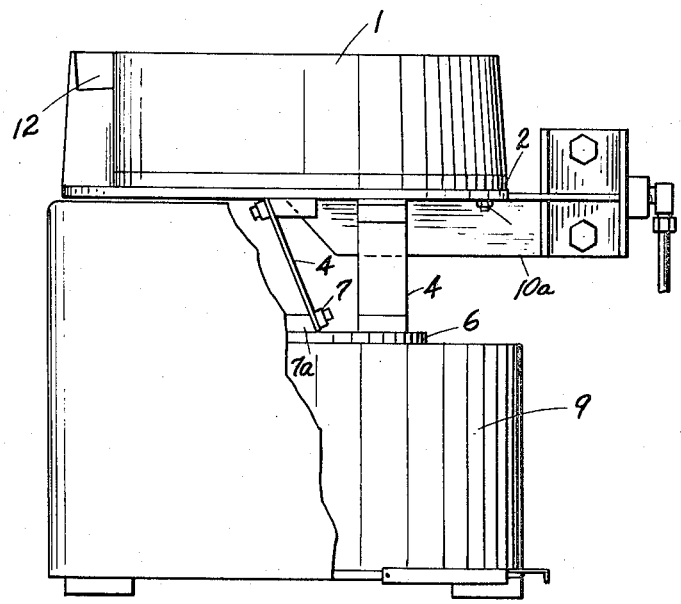
FIGURE 1 is a side view of a vibratory conveyor of the bowl feeder type, constructed in accordance with this invention, with a portion of the housing cut away to reveal the mounting of a receptacle on a drive plate, which is in turn mounted on springs, and which also reveals the mounting of the vibratory-inducing device of the present invention on the drive plate.
Figure 2:
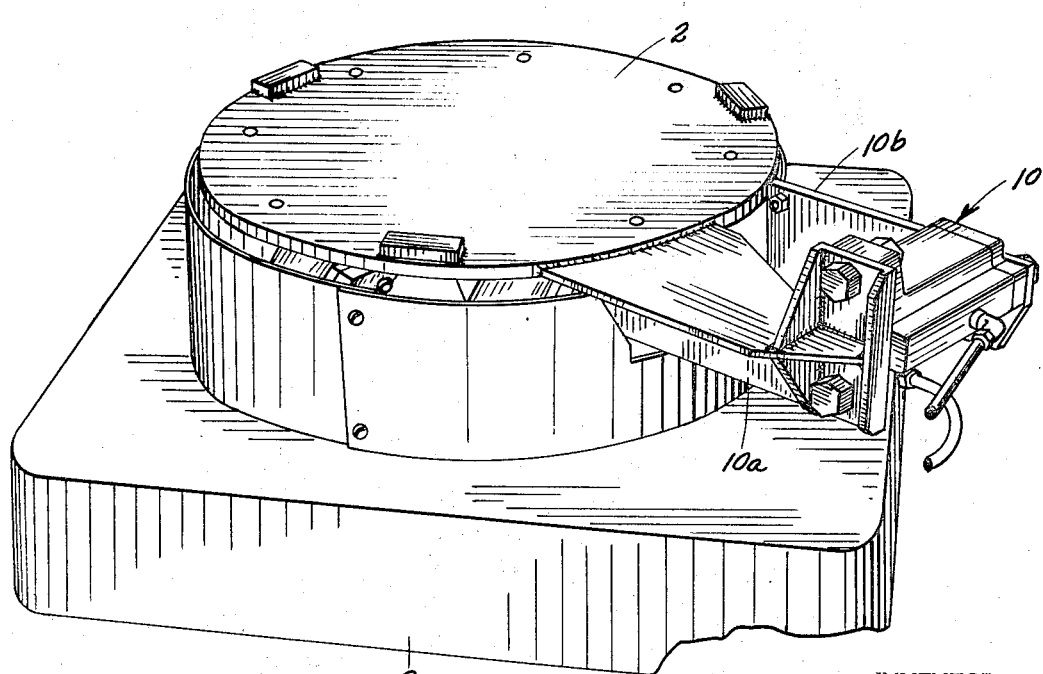
FIGURE 2 is a perspective view of a vibratory bowl conveyor drive unit, with the bowl removed, utilizing a free-piston, vibration-inducing device.
Figure 3:
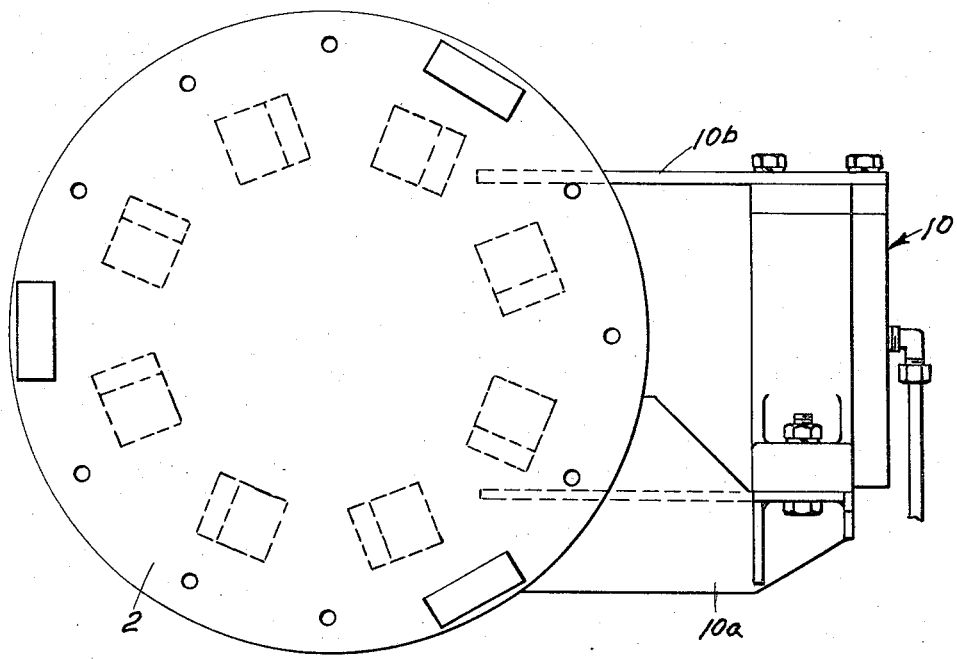
FIGURE 3 is a top view of the drive plate with projecting support arms and mounted on the support arms is a pneumatic free-piston, vibration-inducing device and drive plate member.
Figure 4:
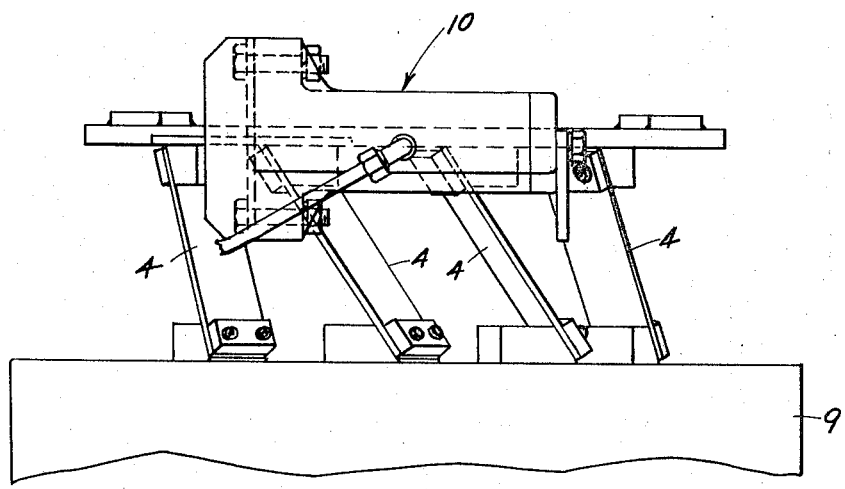
FIGURE 4 is a side elevational view of the pneumatic free-piston vibration-inducing device and plate member.

Referring more particularly to the drawings, there is shown as the receptacle, a feeder bowl 1. The feeder bowl 1 may be cast or fabricated from any convenient material, one such material being a polyester reinforced with glass fibers, others being aluminum or steel. The feeder bowl 1 which is described in U.S. Patent No. 2,985,280, is conveniently affixed to a drive plate 2, such as by bolt 3. The plate 2 is supported upon a plurality of flat springs 4, two of which are shown in FIGURE 1, each of those shown having an opposite counterpart not shown, making a total of four flat springs. This number is merely exemplary, and may be more or less. For example, eight springs circumferentially and uniformly disposed about the vertical axis at the bowl are shown in FIGURES 3 and 4. The springs 4 are conveniently clamped to the plate 2 as by bolts 5, and the other end thereof to a base plate 6 as by bolts 5, through clamp 7–7a. The plate 6 is, in turn, conveniently welded or otherwise secured to a massive base 9.

Also shown is a pneumatic, free-piston vibration-inducing device 10 mounted to an extended support arm attached to the drive plate 2. Arm 10b serves to stabilize the device. A vibration-inducing device of the free-piston type is described in each of U.S. Patent Nos. 3,023,738 and 2,985,280.

These free-piston, pneumatic vibration-inducing devices provide a continuous deceleration and acceleration of the moving piston due to the entrapment and escape of gases, as distinct from that in an impacting type of action. The power input in one direction of the piston is the same as the power input in the opposite direction. When using this type of a vibrator, the frequency can be varied in response to the gas pressure during operation. It is possible to operate at natural frequency and, thus, take advantage of the vast increase in performance at this point, which performance falls rapidly away as one departs a few cycles either way from natural frequency. The pneumatic free-piston devices hereof are capable of immediate tuning to the natural frequency of the system. Reference may be had to U.S. Patent No. 2,861,548 for details of such pneumatic vibration-inducing devices. These devices are characterized by a substantially square wave power profile as detailed in U.S. Patent No. 3,186,537.

As indicated above, there are usually four modified single member flat springs 4, spaced 90° apart and equidistant from the axis of the bowl 1, although eight such springs as shown in FIGURES 3 and 4 may be used in larger installations. The springs 4 are angularly disposed at about 60° inclination to the base 6, although any angular disposition between about 15° and about 80° may be used. The purpose of the angular and circular disposition is to provide that the effect of the spring members is not only to return the bowl upwardly after being lowered, but also to exert a torque in a direction to throw the material counterclockwise (in the example shown in FIGURE 1) along the ramp to the exit 12 of the bowl 1. Reversal of the direction of inclination of the springs will reverse the direction of flow. The confined path of vibration or reciprocation in this embodiment is curved and inclined, and may have a length varying from about .01 inch to .6 inch in larger devices, depending on the desired feed rate.

A suitable power control system is as found in Patent No. 3,023,738, dated Mar. 6, 1962, and which enables the adjustment of frequency of vibration and amplitude of vibration substantially independently one of the other.

The ability to tune the frequency by regulation of gas pressure directed to the free piston by internal porting enables operation of the devices at or near natural frequency, the point of greatest operating efficiency. This control feature distinguishes the pneumatic free piston vibration-inducing device from electromagnetic and electric motor driven mechanical vibration-inducing devices, the frequency of vibration of which is determined by that of the electric power source. The control device also protects the system from variations in power supply, whereas the electrically operated systems are affected directly by changes in voltage to the detriment of their feeding characteristics. Moreover, the pneumatic device has a square wave power profile which is particularly advantageous as distinct from the sine wave power profile which characterizes the electromagnetic and mechanical vibrators.

As illustrated in the drawings, the vibration-inducing device is substantially parallel to and in the same general plane as the plate member. Thus the vibration-inducing device oscillates in substantially the same general plane as the plate member to give the plate member a "shaking" motion; that is, the axis of the vibration-inducing device is positioned on a line parallel to a tangent to a circle having its center at a point equidistant from the springs and in the plane of the plate or an adjacent plane parallel thereto so as to apply a vibratory force to the plate.

To illustrate the improved results obtainable over prior pneumatically driven bowl type parts feeders, the pneumatic vibration-inducing device or pneumatic drive means had a free piston having a 2 inch diameter. The bowl was 35 inches in diameter and formed of .125 inch steel sheet. The massive base was 30 inches by 30 inches by 4.5 inches steel. Eight glass fiber reinforced, 31 ply epoxy resin springs, 6 inches by 2 inches by 0.25 inch, were mounted on a 30° slope to the vertical with their center lines on a 12 inch diameter circle. The natural frequency of each system tested was approximately 1650 cycles per minute. In the first test the vibration-inducing device was conventionally mounted so that the free piston oscillated vertically below the drive plate and in the second test, the same drive was mounted on a side arm extending laterally from the drive plate so that the free piston oscillated horizontally in accordance with the invention.

The results of these two tests were assembled and tabulated as follows:

|  | Conventional | This Invention |
|---|---|---|
| Maximum amplitude, inches | 0.250 | 0.300 |
| Feeding "quality" | Bouncy | (1) |
| Track speed, inches/min | 710 | 980 |
| Feeding factor [2] | 1.72 | 1.98 |
| Increase in efficiency of feeding, percent | | 15 |
| Increase in speed, percent | | 38 |

[1] Very steady.
[2] Measured speed divided by (frequency) (amplitude).

To illustrate the increase in the load carrying capacity, the following comparative data is offered:

| Track speed (in./min.) | Load (conventional apparatus) (lbs.) | Load (apparatus of this invention) (lbs.) | Factor of Increase (times) |
|---|---|---|---|
| 710 | 10 | 172 | 17.2 |
| 600 | 30 | 214 | 7.1 |
| 500 | 40 | 240 | 6.0 |
| 400 | 46 | 270 | 5.85 |

It has also been found that the plate member can have attched thereon a pair of synchronized vibration-inducing device 180° apart. The load carrying capacity of such a unit is substantially improved over a one drive unit.

Because of the improved configuration as herein contemplated, the drive angle ($\alpha$) along the bowl edge is a minimum of 7 degrees with the average angle for good feeding from 10 to 11 degrees. The drive angle for conventional vibratory devices is a minimum of 13 degrees and about 15 degrees for good feeding action. The drive angle, which is the angle of movement of a point at the bowl perimeter, is a measure of the bounce or the up and down movement of the moving material within the bowl. The smaller the angle the less energy expended in useless movement of the material. Also, the track within the bowl often has a selection type device incorporated into it so that as the material is advanced along the track it can be sorted as to properties. Thus, it can be seen that the more stable the material, the more accurate is the selection, and the higher the quality of the selected material.

It has also been found that the diameter of the circle described by the spring centerlines is important in obtaining the optimum geometric configuration for a given bowl, drive, spring system, and base assembly. It has been found that the amplitude of vibration varies approximately inversely as the diameter of the spring centerlines, i.e., the diameter of the circle which is intersected by the centerline of each of the flat, leaf-type springs circumferentially disposed about the vertical axis of the bowl. The parameter which is used for optimum design of a parts feeder bowl is the ratio of the bowl diameter to the spring centerline diameter. In a sidearm drive device, it has been found that this ratio is optimum at from about 1.9 to about 3.0. The bowl diameter is the overall diameter of the bowl at the upper lip. The spring centerline diameter is as described above.

In summary, the optimum geometric design parameter which yields optimum performance over the broadest range of variation in weight in the bowl is achieved in accordance with the following, as compared to conventional vibratory parts feeder design parameters:

| Item | Conventional | O.G.D. |
|---|---|---|
| Vibratory Mounting | Central and Vertical | Side and Horizontal. |
| Effective Drive | Minimum plus 13° | Minimum 7°. |
| Angle at Bowl Track | Maximum plus 18° | Maximum Unknown. |
| Sidewall | For Good Action, 15° | For Good Action, 10°–11°. |
| Spring Centerline Diameter (30° springs). | 16 inches | 12 inches. |
| Bowl diameter | 35 inches | 35 inches. |
| Ratio of Bowl Size of Spring Centerline Diameter. | 2.2 | 2.9. |
| Maximum Amplitude | .250 inch | .300 inch. |

What is claimed is:
1. In a vibratory bowl conveyor comprising a circular receptacle supported upon a base plate, said base plate being resiliently mounted upon a plurality of inclined springs radially disposed about an axis normal to and extending through the center of the bottom of the circular bowl and attached to a base member, the improvement which comprises lateral support means projecting laterally from said base plate, and a pneumatic, free-piston vibration-inducing device radially disposed from the center of said bowl secured to the outer extremity of said laterally projecting support means, the free piston of said vibration-inducing device being positioned to oscillate substantially in the plane of said base plate.

2. A vibratory bowl conveyor comprising a circular bowl having a bottom, an upstanding annular wall, and an inclined spiral conveyor track extending from the bottom upwardly around the annular wall, the track progressively receding from the center of the bottom of said bowl as the spiral conveyor track approaches the rim of the bowl, a base plate to support the receptacle, the base plate including a lateral support means projecting laterally from the plate, a pneumatic, free-piston vibration-inducing device mounted on said laterally projecting support means and radially disposed from the center of the bowl, the free piston of said vibration-inducing device being adapted to oscillate substantially in the plane of the base plate along a line parallel to a tangent to a circle having its center at a point equidistant from the springs and in the plane of the plate, the base plate being resiliently mounted upon a plurality of inclined springs radially disposed about an axis normal to and extending through the center of the bottom of the circular bowl and at an angle to the plane of the base to support the base and to guide the bowl along an arcuate path of movement, and the springs being attached at one end portion to a massive base member.

3. The vibratory bowl conveyor of claim 2 wherein the support means is a pair of spaced apart support arms, parallel to one another and adapted to support the pneumatic, free-piston vibration-inducing device.

4. The vibratory bowl conveyor of claim 2 wherein the ratio of the diameter of the bowl to the spring centerline diameter is within the range of from 2.5 to 3.5.

References Cited

UNITED STATES PATENTS

| 1,810,882 | 6/1931 | Heymann | 198—220 |
| 3,023,738 | 4/1962 | Burgess | 198—220 |

RICHARD E. AEGERTER, *Primary Examiner.*

EVON C. BLUNK, *Examiner.*